US012681510B2

(12) United States Patent
Giebel

(10) Patent No.: US 12,681,510 B2
(45) Date of Patent: Jul. 14, 2026

(54) ADJUSTABLE GAS PRESSURE REGULATOR FOR OUTDOOR APPLIANCES

(71) Applicant: WH Products, LLC, Columbus, OH (US)

(72) Inventor: Michael R. Giebel, Joplin, MO (US)

(73) Assignee: WH Products, LLC, Columbus, OH (US)

( * ) Notice: Subject to any disclaimer, the term of this patent is extended or adjusted under 35 U.S.C. 154(b) by 99 days.

(21) Appl. No.: 18/766,969

(22) Filed: Jul. 9, 2024

(65) Prior Publication Data

US 2025/0021113 A1 Jan. 16, 2025

Related U.S. Application Data

(60) Provisional application No. 63/525,749, filed on Jul. 10, 2023.

(51) Int. Cl.
*G05D 16/06* (2006.01)
*F17C 13/04* (2006.01)

(52) U.S. Cl.
CPC ......... *G05D 16/0636* (2013.01); *F17C 13/04* (2013.01); *F17C 2205/0338* (2013.01); *F17C 2221/035* (2013.01); *F17C 2270/07* (2013.01)

(58) Field of Classification Search
CPC .......... G05D 16/0636; G05D 16/0669; G05D 16/107; Y10T 137/7895; Y10T 137/7896; Y10T 137/87748; F17C 13/04; F16K 17/06
See application file for complete search history.

(56) References Cited

U.S. PATENT DOCUMENTS

| | | | | | |
|---|---|---|---|---|---|
| 4,696,320 A | * | 9/1987 | Bull | .................... | G05D 16/0661 |
| | | | | | 137/116.5 |
| 5,924,443 A | * | 7/1999 | Wohlfahrt | .......... | G05D 16/0669 |
| | | | | | 137/116.5 |
| 6,431,205 B1 | * | 8/2002 | Bartos | ................ | G05D 16/0686 |
| | | | | | 137/505.46 |
| 12,158,267 B2 | * | 12/2024 | Giebel | ................ | A47J 37/0713 |
| 2005/0166969 A1 | * | 8/2005 | Olds | .................. | G05D 16/0686 |
| | | | | | 137/505.46 |
| 2015/0205306 A1 | * | 7/2015 | Schmitz | .............. | F16K 31/1221 |
| | | | | | 137/505.41 |
| 2016/0161955 A1 | * | 6/2016 | Dionisio | ................. | F17C 13/00 |
| | | | | | 137/505 |
| 2019/0264847 A1 | * | 8/2019 | Blanchard | ............. | F16L 25/023 |

* cited by examiner

*Primary Examiner* — Jessica Cahill
(74) *Attorney, Agent, or Firm* — TUCKER ELLIS LLP

(57) ABSTRACT

A pressure regulator includes a regulator housing and a regulator adjustment assembly configured to translate between two fixed positions to provide first and second levels of gas flow through the regulator housing. The regulator adjustment assembly may include an upper button assembly and an adjacent collar assembly that move between two fixed positions relative to each other to provide the different levels of gas flow.

18 Claims, 5 Drawing Sheets

400
500
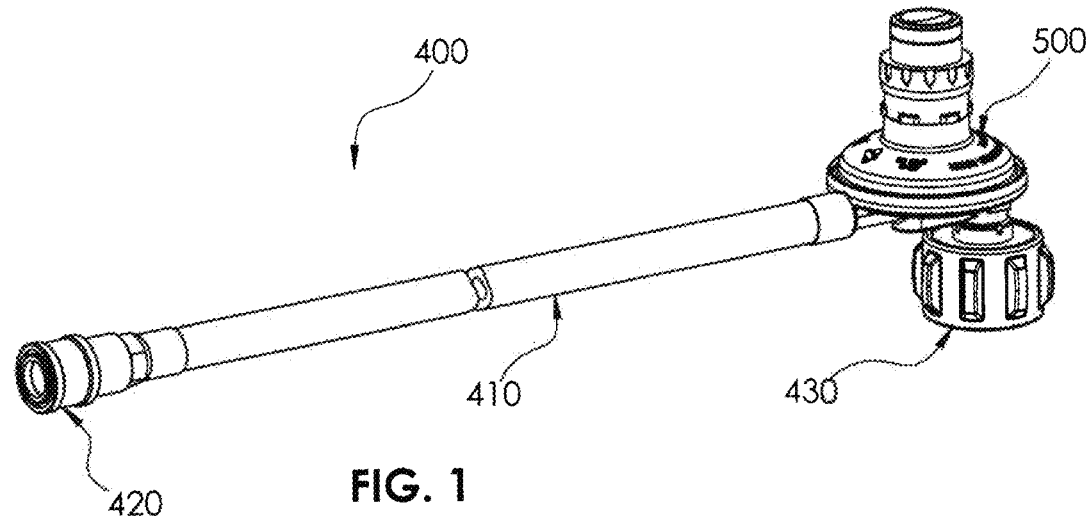
410
430
420
FIG. 1
444
442
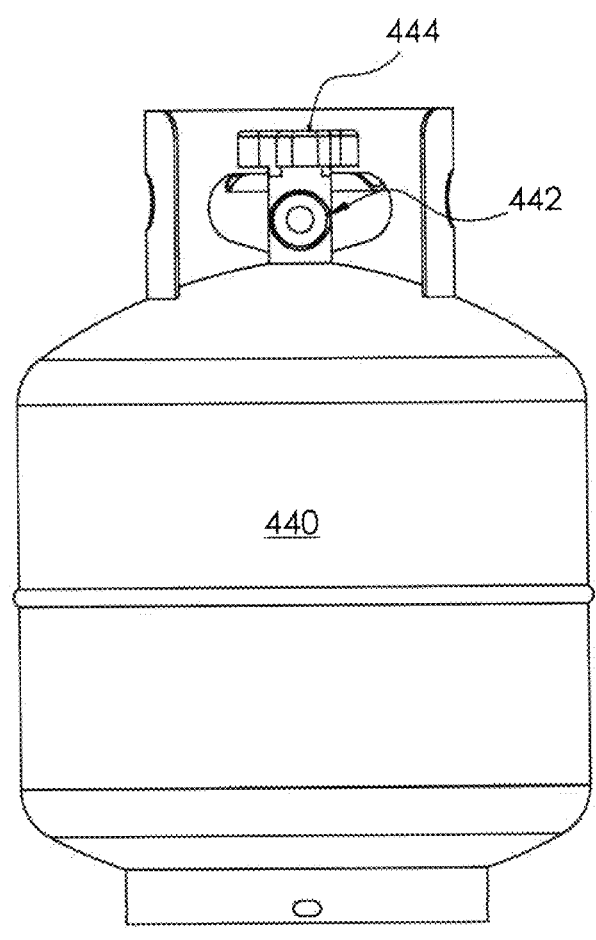
440

ADJUSTABLE GAS PRESSURE REGULATOR FOR OUTDOOR APPLIANCES

CROSS-REFERENCE TO RELATED APPLICATIONS

This application claims the benefit of U.S. Provisional Application No. 63/525,749 filed Jul. 10, 2023, entitled Adjustable Gas Pressure Regulator for Outdoor Appliances, the disclosure of which is hereby incorporated by reference herein in its entirety.

FIELD OF THE INVENTION

Embodiments of the present invention relate to gas regulators used to adjust the pressure of gas supplied to outdoor appliances for combustion.

BACKGROUND OF THE INVENTION

Outdoor cooking, and particularly the use of outdoor barbecue grills, smokers, ovens, and griddles, remains very popular. A number of different appliances are currently available to cook food outdoors. All such appliances include a cooking surface or structure to support food items, and historically the most popular outdoor primary cooking surfaces have been grill surfaces. A grill surface typically includes spaced metal elements, such as rods, that support food items above a heat source and permit juices and grease to fall through the spaces between the spaced elements. Outdoor griddle and oven cooking has also become increasingly desirable. Griddles typically include cooking surfaces having a relatively flat, continuous, heated, normally metal, surface for supporting food. The primary difference between griddle surfaces and grill surfaces is that the former do not include spaced elements that permit direct contact between food and a heat source flame, such as a propane burner flame.

Outdoor cooking grills, ovens, and outdoor cooking griddles, as well as other outdoor cooking, heating and lighting appliances (collectively referred to as "outdoor appliances") frequently utilize propane gas for combustion to generate heat and/or light. Propane gas fueled outdoor appliances are usually connected to a portable and replaceable propane tank or cylinder. Propane cylinders come in a variety of sizes, such as 1 pound, 5 pound, 10 pound, 20 pound, and 30 pound cylinder sizes, for example. While such cylinders include a handwheel operated valve to control the flow of propane gas, such valves may be difficult to set to provide a specific level of propane gas pressure. It is desirable to be able to set the propane cylinder to provide specific predetermined levels of gas flow so that the maximum amount of heat or light produced by the outdoor appliance, as well as the duration of the fuel source, is controllable in a simple manner.

Typically, a propane regulator is provided between the propane cylinder and a propane fueled outdoor appliance. Such regulators are designed to provide a single pre-set level of gas pressure to the outdoor appliance under a particular set of conditions (e.g., ambient and cylinder conditions). Some propane regulators, however, incorporate a valve that may be set to provide different levels of gas pressure. For example, U.S. Pub. Application 2022/0065448 discloses an adjustable low pressure regulator that includes a rotatable knob which, when turned by hand, adjusts the gas pressure provided by the regulator. The rotatable knob control mechanism has at least two disadvantages, however. First, incorrect or accidental over or under rotation of the knob may result in the provision of an undesired level of gas pressure impacting both the amount of heat and/or light produced as well as the duration of fuel supply. Second, rotation of the knob takes time, and the regulator is often located in a cart which is difficult to access and which is sometimes at an elevated temperature. Moreover, in order to access the knob and rotate it, the user's face is often placed in close proximity to a hot grill, oven or griddle head unit or fire box. It is desirable to minimize the time a user's face is in such a vulnerable position.

Accordingly, there is a need for a low pressure adjustable regulator that prevents a user from incorrectly or accidentally setting the regulator to an undesired level of gas pressure. There is also a need for a low pressure adjustable regulator that easily and quickly adjusts the gas pressure output of the regulator between two known preset gas pressure levels to provide different levels of maximum heat and/or light and to provide different levels of fuel supply duration. There is still further a need for a low pressure adjustable regulator that limits the time a user is placed in close proximity to a hot outdoor appliance during a pressure adjustment operation.

Objects of the Invention

Accordingly, it is an object of some, but not necessarily all embodiments of the present invention to provide a low pressure adjustable regulator for providing a supply of propane gas to an outdoor appliance that prevents a user from incorrectly or accidentally setting the regulator to an undesired level of gas pressure.

It is also an object of some but not necessarily all embodiments of the present invention to provide a low pressure adjustable regulator that easily and quickly adjusts the gas pressure output of the regulator between two known preset gas pressure levels.

It is also an object of some but not necessarily all embodiments of the present invention to provide a low pressure adjustable regulator that limits the time a user is placed in close proximity to a hot outdoor appliance during a pressure adjustment operation.

SUMMARY OF EMBODIMENTS OF THE INVENTION

Responsive to the foregoing challenges, Applicant has developed an innovative low pressure adjustable regulator, comprising a button and collar assembly that may be used to quickly and easily adjust the gas pressure output of the regulator between two known preset gas pressures.

Applicant has further developed an innovative low pressure adjustable regulator, comprising a button and collar assembly that may be used to quickly and easily adjust the gas pressure output of the regulator between about 11 inches water column pressure and about 9.5 inches water column pressure.

Applicant has still further developed an innovative low pressure adjustable regulator, comprising a button and collar assembly that prevents mis-adjustment of the gas pressure output of the regulator.

Applicant has still further developed a pressure regulator for delivering fuel to a gas fueled apparatus, comprising: a regulator housing, said regulator housing having an inlet communicating with a lower chamber, a connector outlet communicating with the lower chamber, and an upper extension communicating with an upper chamber; a diaphragm assembly disposed within the regulator housing, said diaphragm assembly separating the upper chamber from the lower chamber within the regulator housing; a pin assembly extending from the upper chamber through a central portion of the diaphragm assembly to the lower chamber; a lever engaged at a first lever end by the pin assembly and having a second lever end disposed above the regulator housing inlet; and a regulator adjustment assembly attached to the regulator housing at the regulator housing upper extension, wherein the regulator adjustment assembly includes: a collar mount attached to the upper extension, said collar mounting having a central opening extending therethrough; an upper button assembly distal from the collar mount; and a collar assembly disposed between the collar mount and the upper button assembly, said collar assembly having a central opening extending therethrough, wherein the upper button assembly is configured to translate between two fixed positions relative to the collar assembly to provide first and second levels of gas flow through the lower chamber of the regulator housing as a result of a vertical depression of the upper button assembly.

Applicant has still further developed a pressure regulator for delivering fuel to a gas fueled apparatus, comprising: a regulator housing, said regulator housing having an inlet communicating with a lower chamber, a connector outlet communicating with the lower chamber, and an upper extension communicating with an upper chamber; and a regulator adjustment assembly attached to the regulator housing at the regulator housing upper extension, wherein the regulator adjustment assembly includes: a collar mount attached to the upper extension, said collar mounting having a central opening extending therethrough; an upper button assembly distal from the collar mount; and a collar assembly disposed between the collar mount and the upper button assembly, said collar assembly having a central opening extending therethrough, wherein the upper button assembly is configured to translate between two fixed positions relative to the collar assembly to provide first and second levels of gas flow through the lower chamber of the regulator housing.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

FIG. 1 is a perspective view of a propane connection assembly and propane tank for use therewith in accordance with embodiments of the invention.

DETAILED DESCRIPTION OF EMBODIMENTS OF THE INVENTION

Figure 2:
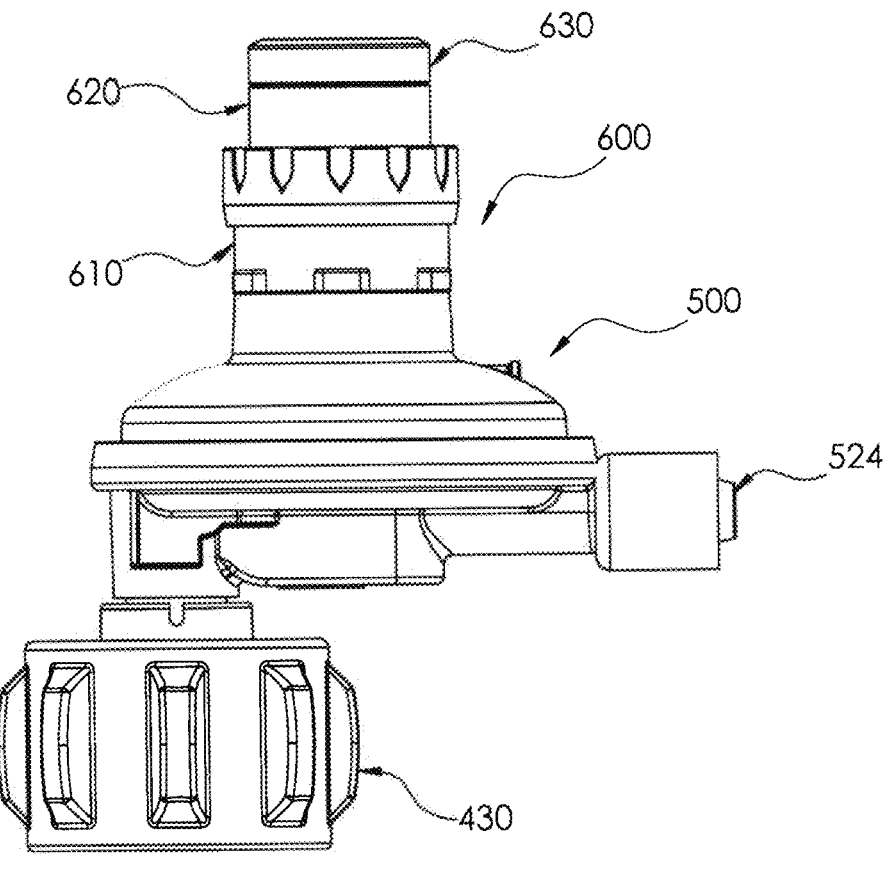
FIG. 2 is side view of a low pressure adjustable regulator in accordance with embodiments of the invention.
Figure 3:
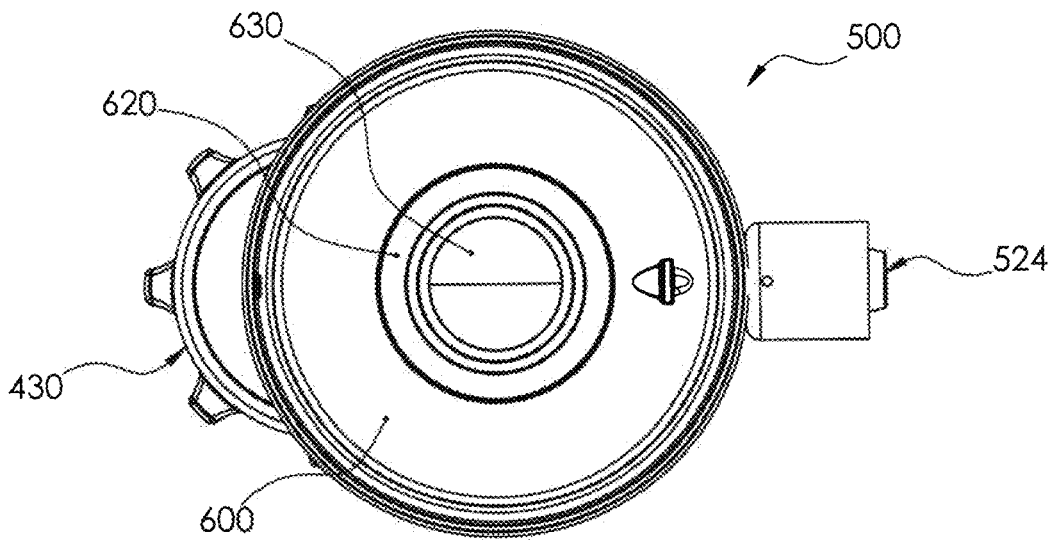
FIG. 3 is a top view of a low pressure adjustable regulator in accordance with embodiments of the invention.

Reference will now be made in detail to embodiments of the present invention, examples of which are illustrated in the accompanying drawings. With reference to FIGS. 1-3, a propane connection assembly 400 for conveyance of propane fuel from a propane tank 440 to an outdoor appliance (not shown) are illustrated. The propane connection assembly 400 may include an appliance coupling 420 at a first end, and a low pressure regulator 500 at a second end, which are interconnected by a hose 410. The low pressure regulator 500 may include a regulator hose connector 524 adapted to receive and securely connect to the hose 410.

With reference to FIGS. 1-4, the low pressure regulator 500 also may be connected to a regulator tank coupling 430 which includes internal screw threads configured to engage mating screw threads provided on a propane tank outlet 442 provided with the propane tank 440. The regulator tank coupling 430 may incorporate a tank connection valve 432 which permits the flow of propane gas therethrough once the regulator tank coupling is fully seated against the propane tank outlet 442. A propane tank handwheel 444 may be provided in proximity to the propane tank outlet 442 to open and close a main valve (not shown) provided between the propane tank 440 main cylinder and the propane tank outlet.

With reference to FIGS. 2-7, the low pressure regulator 500 may include an outer clam shell-like housing 510 which defines an upper chamber 512 and a lower chamber 514 that are separated by a diaphragm assembly 516. The housing 510 further defines a regulator inlet 522 through which propane gas may enter the lower chamber 514. The housing also defines a regulator outlet at the hose connector 524 through which propane gas exits the lower chamber 514. The diaphragm assembly 516 may be biased downward toward the lower chamber 514 by a button spring 634 disposed between the diaphragm assembly and a button pressure plate 632. The diaphragm assembly 516 also may be biased downward toward the lower chamber 514 by a pin spring disposed between the diaphragm assembly and a pin assembly 526. The pin spring may be concentric with and disposed inside of the button spring 634.

The diaphragm assembly 516 may include a central passage through which the pin assembly 526 extends vertically. The pin assembly 526 may include an opening in its lower end configured to receive a first end of a lever 518. The lever 518 may pivot about a lever pivot pin 520 as a result of vertical translation of the pin assembly 526 under the influence of the diaphragm assembly 516. A second end of the lever 518 is located above the regulator opening 522. The amount and/or pressure of propane gas that flows into the lower chamber 514, and consequently, the amount and/or pressure of gas that flows through regulator outlet at the hose connector 524, may be controlled by selective pivoting of the lever 518 to increase or decrease the degree to which the regulator inlet 522 is blocked by the second end of the lever.

A regulator adjustment assembly 600 may be provided in order to control the maximum amount of propane gas flow and/or pressure that is permitted by the diaphragm assembly 516, the pin assembly 526 and the lever 518. Preferably, the regulator adjustment assembly 600 may enable a user to quickly and easily adjust the gas pressure output of the regulator 500 between two known preset gas pressures. More preferably, the regulator adjustment assembly 600 may be used to quickly and easily adjust the gas pressure output of the regulator 500 between about 11 inches water column pressure and about 9.5 inches water column pressure.

The regulator adjustment assembly 600 may extend upward and away from the regulator housing 510 on the opposite side from the regulator tank coupling 430. The regulator adjustment assembly 600 may have a generally tubular outer shape comprised of three primary cooperating elements: a lower collar mount 610, an upper button assembly 630, and an intermediary collar assembly 620. The collar mount 610 may be attached, secured and scaled against a tubular upper extension of the regulator housing 510 using cooperating threaded surfaces, for example. The collar assembly 620 may be disposed above and slidingly receive the collar mount 610. A collar spring 614 may bias the collar assembly 620 away from the collar mount 610. The button assembly 630 may include a button cap 631 and a button shaft 636 that extends from the button cap at an upper end through a central opening provided in the collar assembly 620 and through a central opening provided in the top of the collar mount 610. The button shaft 636 may abut or be connected to a button pressure plate 632.

The collar mount 610 may define a hollow interior space which is in gas (e.g., air) communication with the upper chamber 512 of the regulator housing 510. The hollow interior space of the collar mount 610 also may be configured to receive the upper portion of the button spring 634, the button pressure plate 632, and the lower portion of the button shaft 636. The button spring 634 acts on the button plate 632 in a manner that biases the button shaft 636 upward and away from the regulator housing 510. The button spring 634 and the button pressure plate 632 may be sized so as to be able to freely move vertically within the hollow interior space of the collar mount 610. The button shaft 636 may be configured to slide freely within the central opening in the top of the collar mount 610.

The collar assembly 620 may include a lower shell portion defining a wall that is configured to slidingly engage the outer wall of the collar mount 610. The inner surface of the collar assembly 620 shell wall and the outer wall of the collar mount 610 may be concentric and sized so that the collar mount acts as a guide for the vertical movement of the collar assembly 620. A collar spring 614 may be disposed within the lower shell portion of the collar assembly 620. The collar spring 614 may bias the collar assembly upward and away from the collar mount 610.

The collar assembly 620 also may include an upper collar 622 and a lower collar 623. The lower collar 623 may define a tubular central opening which slidingly receives and serves as a guide for the vertical movement of the button shaft 636 relative to the collar assembly 620. The lower collar 623 may include a ring-shaped shoulder that may be a beveled portion extending from its central opening to an upper upright circular wall. The lower collar 623 may have an outer diameter that is slidingly received by a tubular central opening formed in the upper collar 622. Like the lower collar, the upper collar 622 may include a ring-shaped beveled portion extending from its central opening to an upper upright circular wall. The interior wall of the central opening of the upper collar 622 may include one or more indentations that are configured to receive a mating bearing 612. The upper collar 622 may be fixed to or connected to the lower shell portion of the collar assembly 620.

With renewed reference to the button shaft 636, the upper portion thereof may include a ring-shaped recess provided above an adjacent ring-shaped annulus. The annulus formed on the button shaft 636 may be defined by upper and lower circular shoulders that may be beveled portions separated by an intermediary flat ring. The beveled portion of the lower collar 623 may be configured to receive and mate with a complimentary lower beveled portion of the annulus formed on the button shaft 636. The recess in the button shaft 636 may be defined by upper and lower circular beveled portions separated by an intermediary flat ring, wherein the lower circular beveled portion of the recess also serves as the upper beveled portion of the annulus. The bearing 612 may be sized to fit securely, but not permanently, within the recess in the button shaft 636.

Figure 4:
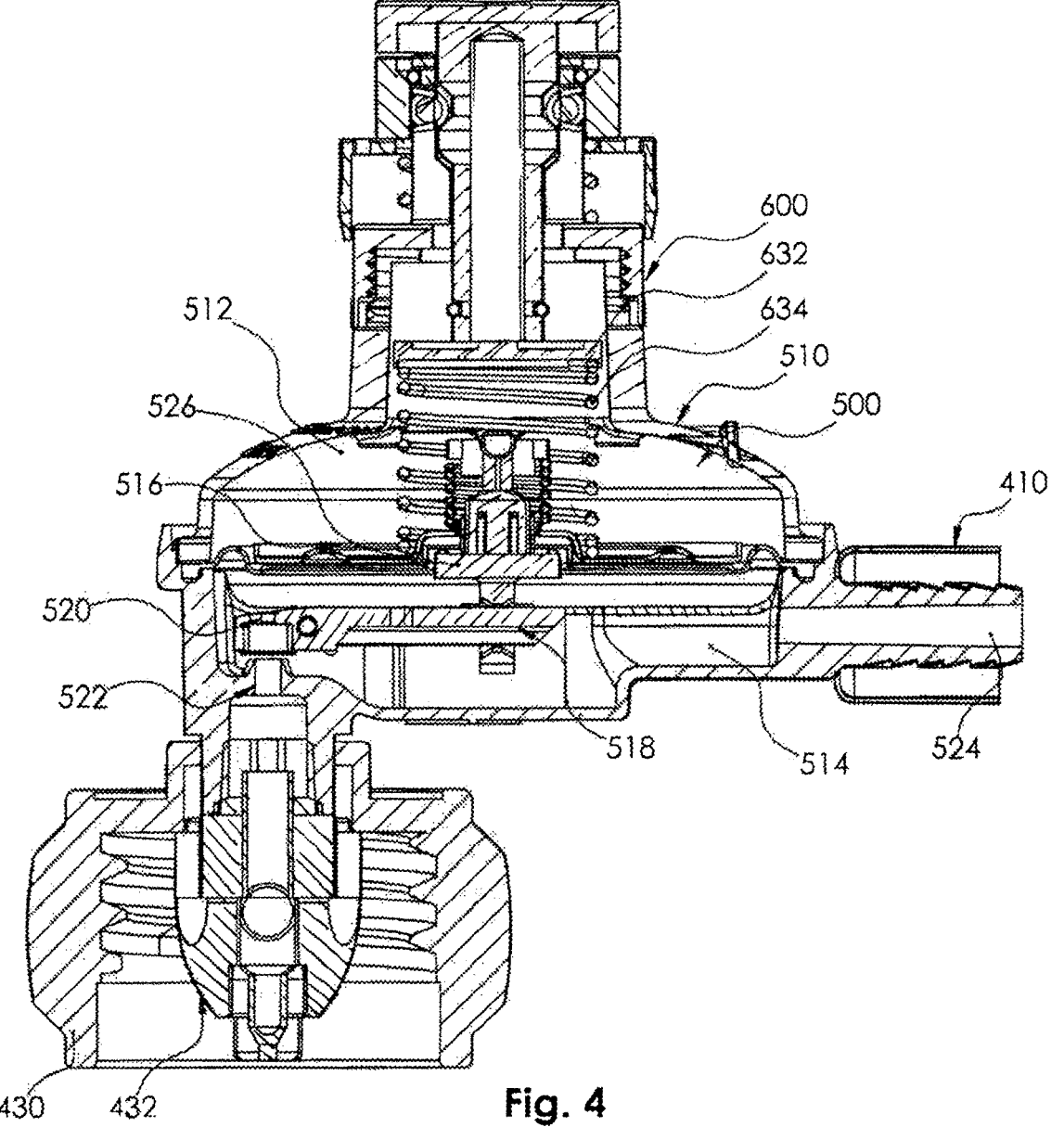
FIG. 4 is a cross-sectional side view of a low pressure adjustable regulator in accordance with embodiments of the invention.
Figure 5:
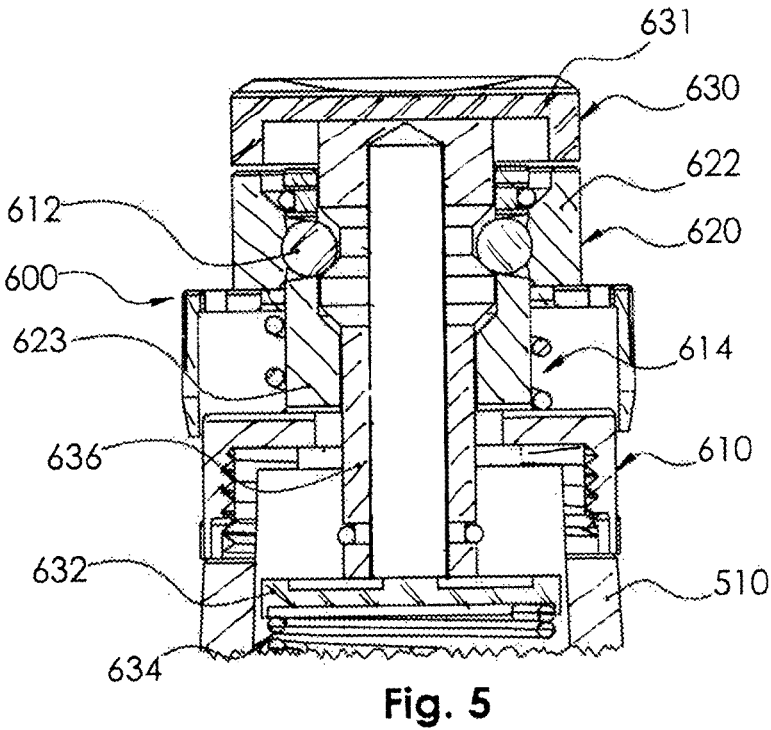
FIG. 5 is a cross-sectional side view of a regulator adjustment assembly provided in position to provide a first gas pressure level in accordance with embodiments of the invention.

The regulator adjustment assembly 600 may be used as follows. With reference to FIG. 5, the collar assembly 620 and the button assembly 630 are shown in a position to provide about eleven (11) inches of water column gas pressure. In the position of FIG. 5, the one or more bearings 612 are wedged into the recess formed in the button shaft 636 by the central opening wall of the upper collar 622. As a result, the button assembly 630 is locked into a collapsed position. With reference to FIGS. 4 and 5, the positions of the button assembly 630, the pin assembly 526, and the diaphragm assembly 516 permit a predetermined flow of propane gas through the regulator inlet 522 of about 11 inches water column. As gas flows through the regulator inlet 522, it flows into the lower chamber 514 of the regulator housing 500 such that the gas may provide a force pushing upward on the diaphragm assembly 516 that counteracts the downward bias of the button assembly 630. The movement of the diaphragm assembly 516 controls the propane gas pressure provided at the regulator hose connector 524, and thus the pressure provided to any connected outdoor appliance.

Figure 6:
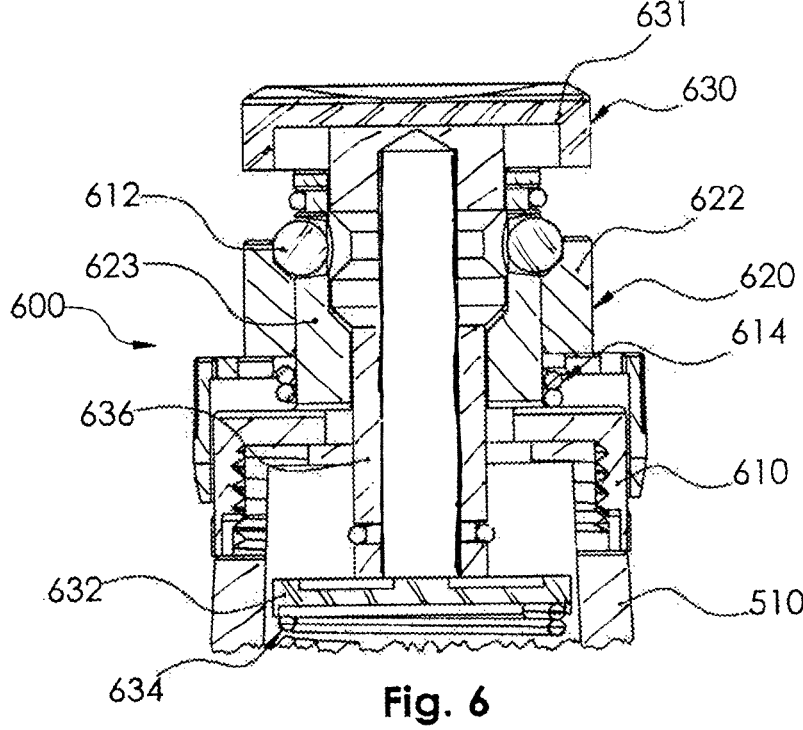
FIG. 6 is a cross-sectional side view of the regulator adjustment assembly provided in an intermediate position when changing between providing first and second gas pressure levels in accordance with embodiments of the invention.
Figure 7:
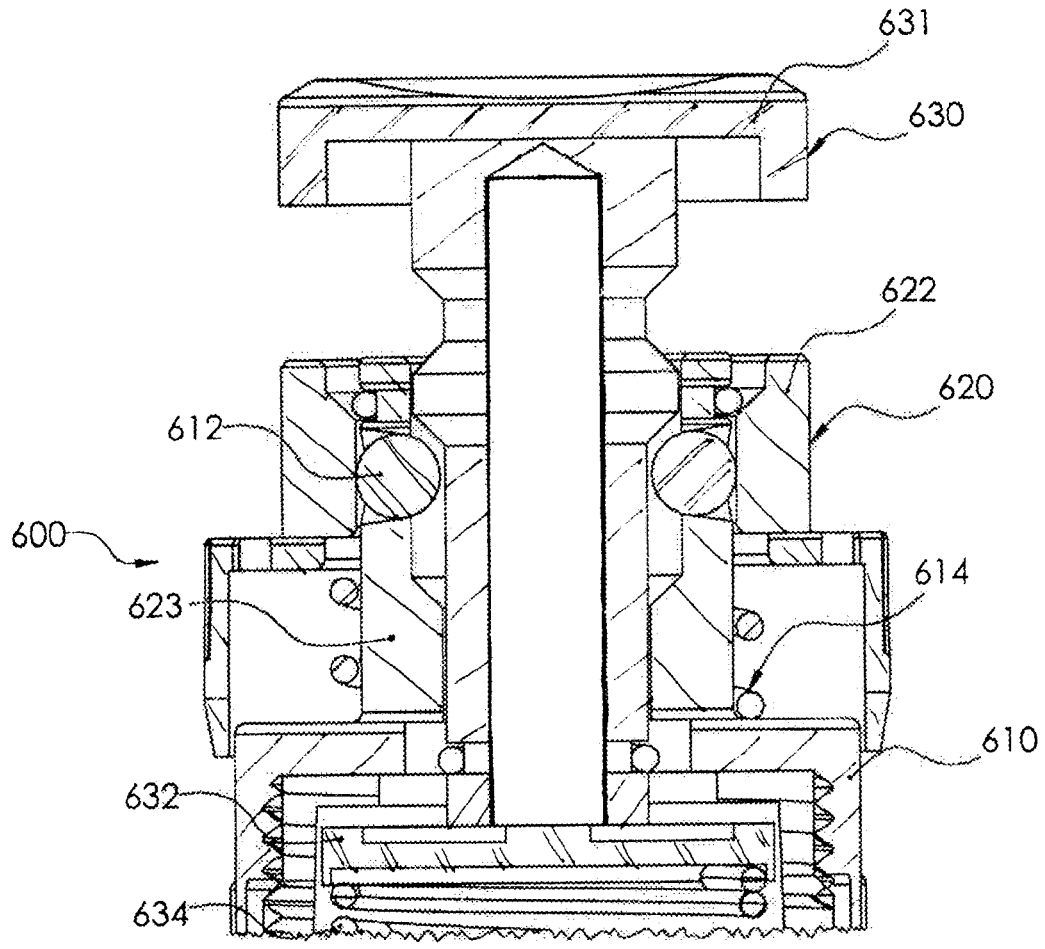
FIG. 7 is a cross-sectional side view of the regulator adjustment assembly provided in position to provide a second gas pressure level in accordance with embodiments of the invention.

In order to switch to a position to provide about nine and one-half (9.5) inches of water column gas pressure, the lower shell portion and connected upper collar 622 of the collar assembly 620 may be pressed downward relative to the collar mount 610 thereby compressing the collar spring 614, as shown in FIG. 6. With continued reference to FIG. 6, the downward translation of the upper collar 622 may cause the one or more bearings 612 to be released from the recess formed in the button shaft 636, and pop outward to rest against the beveled portion of the upper collar. With reference to FIG. 7, the release of the one or more bearings 612 permits the button shaft 636 to translate upward under the bias of the button spring 634 until the travel of the button spring reaches a maximum and/or the button pressure plate 632 comes into contact with the upper collar mount 610 internal surface. As the button shaft 636 translates upward, the lower shell portion and connected upper collar 622 of the collar assembly 620 may also translate upward relative to the collar mount 610 under the influence of the collar spring 614 thereby pressing the one or more bearings outward so as to engage the lower most beveled portion of the annulus formed on the button shaft 636. With reference to FIGS. 4 and 7, the positions of the button assembly 630, the pin assembly 526, and the diaphragm assembly 516 permit a predetermined flow of propane gas through the regulator inlet 522 of about 9.5 inches water column. As a result of the positions of these elements, gas flows through the regulator inlet 522 and into the lower chamber 514 of the regulator housing 500 such that the gas may provide a force pushing upward on the diaphragm assembly 516 that counteracts the downward bias of the button assembly 630.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What I claim is:

1. A pressure regulator for delivering fuel to a gas fueled apparatus, comprising:
   a regulator housing, said regulator housing having an inlet communicating with a lower chamber, a connector outlet communicating with the lower chamber, and an upper extension communicating with an upper chamber;
   a diaphragm assembly disposed within the regulator housing, said diaphragm assembly separating the upper chamber from the lower chamber within the regulator housing;
   a pin assembly extending from the upper chamber through a central portion of the diaphragm assembly to the lower chamber;
   a lever engaged at a first lever end by the pin assembly and having a second lever end disposed above the regulator housing inlet; and
   a regulator adjustment assembly attached to the regulator housing at the regulator housing upper extension,
   wherein the regulator adjustment assembly includes:
   a collar mount attached to the upper extension and having a central opening extending therethrough;
   an upper button assembly distal from the collar mount; and
   a collar assembly disposed between the collar mount and the upper button assembly such that the collar assembly slidingly receives the collar mount, said collar assembly having a central opening extending therethrough,
   wherein the upper button assembly is configured to translate between two fixed positions relative to the collar assembly to provide first and second levels of gas flow through the lower chamber of the regulator housing as a result of a vertical depression of the upper button assembly.

2. The pressure regulator of claim 1 further comprising a collar spring biasing the collar assembly away from the collar mount.

3. The pressure regulator of claim 2 wherein the button assembly includes:
   a button cap; and
   a button shaft extending from the button cap at a button shaft upper end through the central opening in the collar assembly and through the central opening in the collar mount.

4. The pressure regulator of claim 3 further comprising:
   a pressure plate engaged by a lower end of the button shaft; and

a button spring disposed between the pressure plate and the diaphragm assembly.

5. The pressure regulator of claim 4 further comprising a set of bearings disposed between the button shaft and the collar assembly.

6. The pressure regulator of claim 3 wherein the collar assembly includes an upper collar proximal to the button cap and a lower collar distal from the button cap.

7. The pressure regulator of claim 6 further comprising a set of bearings disposed between the button shaft and the upper collar.

8. The pressure regulator of claim 7 further comprising:
   a ring shaped annulus formed on the button shaft; and
   a ring shaped recess formed on the button shaft above of the ring shaped annulus,
   wherein the ring shaped recess is configured to receive the set of bearings.

9. The pressure regulator of claim 8 wherein the ring shaped annulus is defined by upper and lower circular shoulders separated by an intermediary flat ring, and
   wherein the lower collar includes a shoulder, and
   wherein the shoulder of the lower collar is configured to receive and mate with the lower circular shoulder of the ring shaped annulus.

10. The pressure regulator of claim 1 wherein the button assembly includes:
   a button cap; and
   a button shaft extending from the button cap at a button shaft upper end through the central opening in the collar assembly and through the central opening in the collar mount.

11. The pressure regulator of claim 10 further comprising:
   a pressure plate engaged by a lower end of the button shaft; and
   a button spring disposed below and biasing the pressure plate towards the button shaft.

12. The pressure regulator of claim 10 further comprising a set of bearings disposed between the button shaft and the collar assembly.

13. The pressure regulator of claim 12 further comprising:
   a ring shaped annulus formed on the button shaft; and
   a ring shaped recess formed on the button shaft above of the ring shaped annulus,
   wherein the ring shaped recess is configured to receive the set of bearings.

14. A pressure regulator for delivering fuel to a gas fueled apparatus, comprising:
   a regulator housing, said regulator housing having an inlet communicating with a lower chamber, a connector outlet communicating with the lower chamber, and an upper extension communicating with an upper chamber;
   a diaphragm assembly disposed within the regulator housing, said diaphragm assembly separating the upper chamber from the lower chamber within the regulator housing;
   a pin assembly extending from the upper chamber through a central portion of the diaphragm assembly to the lower chamber;
   a lever engaged at a first lever end by the pin assembly and having a second lever end disposed above the regulator housing inlet; and
   a regulator adjustment assembly attached to the regulator housing at the regulator housing upper extension,
   wherein the regulator adjustment assembly includes:
   a collar mount attached to the upper extension and having a central opening extending therethrough;

an upper button assembly distal from the collar mount;

a collar assembly disposed between the collar mount and the upper button assembly, said collar assembly having a central opening extending therethrough; and a collar spring biasing the collar assembly away from the collar mount;

wherein the upper button assembly is configured to translate between two fixed positions relative to the collar assembly to provide first and second levels of gas flow through the lower chamber of the regulator housing as a result of a vertical depression of the upper button assembly.

15. A pressure regulator for delivering fuel to a gas fueled apparatus, comprising:

a regulator housing, said regulator housing having an inlet communicating with a lower chamber, a connector outlet communicating with the lower chamber, and an upper extension communicating with an upper chamber; and a regulator adjustment assembly attached to the regulator housing at the regulator housing upper extension, wherein the regulator adjustment assembly includes:

a collar mount attached to the upper extension and having a central opening extending therethrough;

an upper button assembly distal from the collar mount;

a collar assembly disposed between the collar mount and the upper button assembly, said collar assembly having a central opening extending therethrough; and a collar spring biasing the collar assembly away from the collar mount, wherein the upper button assembly is configured to translate between two fixed positions relative to the collar assembly to provide first and second levels of gas flow through the lower chamber of the regulator housing.

16. The pressure regulator of claim 15 wherein the button assembly includes:

a button cap; and a button shaft extending from the button cap at a button shaft upper end through the central opening in the collar assembly and through the central opening in the collar mount.

17. The pressure regulator of claim 16 further comprising:

a pressure plate engaged by a lower end of the button shaft; and a button spring disposed below and biasing the pressure plate towards the button shaft.

18. The pressure regulator of claim 16 further comprising:

a set of bearings disposed between the button shaft and the collar assembly;

a ring shaped annulus formed on the button shaft; and a ring shaped recess formed on the button shaft above of the ring shaped annulus, wherein the ring shaped recess is configured to receive the set of bearings.

* * * * *